United States Patent
Girgis-Ghaly et al.

(10) Patent No.: US 6,308,778 B1
(45) Date of Patent: Oct. 30, 2001

(54) COMPOSITIONS AND METHODS OF CATALYZING THE RATE OF IRON REDUCTION DURING ACID TREATMENT OF WELLS

(75) Inventors: Magdy Girgis-Ghaly; John R. Delorey, both of Calgary (CA)

(73) Assignee: BJ Services Company, Houston, TX (US)

(*) Notice: Subject to any disclaimer, the term of this patent is extended or adjusted under 35 U.S.C. 154(b) by 0 days.

(21) Appl. No.: 09/512,118

(22) Filed: Feb. 24, 2000

(30) Foreign Application Priority Data

Feb. 25, 1999 (CA) .................................................. 2263014

(51) Int. Cl.⁷ ............................................................ E21B 43/27
(52) U.S. Cl. ........................... 166/300; 166/307; 507/272; 507/274; 507/275; 507/933
(58) Field of Search ................................ 166/271, 300, 166/307; 507/272, 274, 275, 276, 277, 933

(56) References Cited

U.S. PATENT DOCUMENTS

| | | | |
|---|---|---|---|
| 2,223,933 | * 12/1940 | Garrison | 166/300 |
| 2,227,860 | * 1/1941 | Morgan et al. | 507/274 X |
| 3,021,279 | 2/1962 | Scanley . | |
| 3,348,613 | * 10/1967 | Irani | 166/307 |
| 3,719,229 | * 3/1973 | Tate | 507/933 X |
| 3,773,465 | 11/1973 | Keeney et al. . | |
| 3,816,322 | 6/1974 | Griffin et al. . | |
| 3,865,435 | 2/1975 | Sareen et al. | 299/5 |
| 4,096,914 | 6/1978 | McLaughlin et al. | 166/307 |
| 4,137,972 | 2/1979 | McLaughlin et al. | 166/307 |
| 4,522,658 | * 6/1985 | Walker | 507/275 X |
| 4,679,631 | 7/1987 | Dill et al. | 166/307 |
| 4,683,954 | 8/1987 | Walker et al. | 166/307 |
| 4,752,404 | 6/1988 | Burns et al. | 166/307 X |
| 4,823,874 | 4/1989 | Ford | 166/279 |
| 4,871,024 | 10/1989 | Cizek | 166/307 |
| 4,997,040 | * 3/1991 | Cizek | 166/307 |
| 5,063,997 | 11/1991 | Pachla et al. | 166/279 |
| 5,073,270 | * 12/1991 | Gallup et al. | 507/277 X |
| 5,130,034 | * 7/1992 | Williams et al. | 507/275 X |
| 5,209,859 | * 5/1993 | Williams et al. | 507/275 X |
| 5,674,817 | * 10/1997 | Brezinski et al. | 507/933 X |
| 5,697,443 | * 12/1997 | Brezinski et al. | 166/307 |
| 6,060,435 | * 5/2000 | Beard et al. | 166/300 X |

FOREIGN PATENT DOCUMENTS

| | | |
|---|---|---|
| 402677 | 2/1942 | (CA) . |
| 416682 | 11/1943 | (CA) . |
| 1027889 | 3/1978 | (CA) . |
| 1088726 | 11/1980 | (CA) . |
| 1131899 | 9/1982 | (CA) . |
| 1278178 | 12/1990 | (CA) . |
| 489498 | * 6/1992 | (EP) .................................................. 507/275 |

OTHER PUBLICATIONS

J.R. Delory, and R.S. Taylor, "Recent Studies Into Iron/Surfactant/Sludge Interactions In Acidizing," Petroleum Society of Canadian Institute of Mining, Jun. 1985.

J.R. Delory, and R.S. Taylor, "Iron/Surfactant/Crude Interactions–New Considerations in Acidizing," Brazilian Congress of Petroleum, Oct. 5–10, 1986.

* cited by examiner

*Primary Examiner*—George Suchfield
(74) *Attorney, Agent, or Firm*—O'Keefe, Egan & Peterman, LLP (57) ABSTRACT

Methods and compositions for preventing precipitation of iron compounds during acid treatments of wells by catalyzing the rate of iron reduction during such treatments. Reduction of ferric ions is accelerated utilizing co-catalytic amounts of antimony ions in combination with other materials to minimize precipitation and other complications which result from iron compounds during acid treatments. Such other materials may include co-catalytic amounts of copper ions and optional iodide ions; as well as at least one of phosphinic acid, salt of phosphinic acid, or a mixture thereof.

28 Claims, 1 Drawing Sheet

Fig. 1

COMPOSITIONS AND METHODS OF CATALYZING THE RATE OF IRON REDUCTION DURING ACID TREATMENT OF WELLS

The present application claims priority to Canadian patent application number 2,263,014 filed Feb. 25, 1999.

BACKGROUND OF THE INVENTION

1. Field of the Invention

The present invention relates generally to methods and compositions for preventing precipitation of iron compounds during acid treatments of wells. In particular, this invention relates to methods and compositions for catalyzing the rate of iron reduction during acid treatment of wells. Specifically, this invention relates to a method for accelerating the reduction of ferric ions utilizing antimony ions in combination with other materials to minimize precipitation and other complications which result from iron compounds during acid treatments. Such other materials may include a source of copper ions and at least one of phosphinic acid, salt of phosphinic acid, or a mixture thereof.

2. Description of Related Art

During well treatments and related operations employing acid, contamination of acid by dissolved iron or iron compounds is a known phenomenon. Contamination of a well treating acid by dissolved iron or by iron compounds during the process of acid treating a well bore and/or subterranean formation is almost inevitable. In the treatment of sour wells ferric iron may oxidize sulfides to insoluble elemental sulfur deposits, and ferrous iron can form ferrous sulfides as the acid spends. These materials may cause well plugging. A discussion of dissolved iron problems and previous methods for addressing these problems may be found in Canadian Patent No. 1278178 and U.S. Pat. No. 5,063,997.

As described in the above-mentioned references, it has been estimated that in the absence of an acid prewash levels of 9,000 to 100,000 mg/L of dissolved iron may occur. It has been reported that a source of iron is the mill scale and rust on the steel tubulars used during stimulation in production applications. If an acid wash treatment is carried out prior to a formation treatment, it has been reported that levels of dissolved iron entering a formation will typically be in the range of 1,000 to 2,000 mg/L. Other reports have indicated that small volumes of acid wash may result in iron levels of 500 to 7,000 mg/L contacting the formation. Additional complications such as disposal problems, low reservoir pressure or the presence of a permanent packer around the tubing may make it impossible to conduct an acid wash prior to the acid treatment. Thus, it may be very hard or impossible to reduce levels of dissolved iron to acceptable levels.

As described in the above-mentioned references, many attempts have been made related to reduction of ferric hydroxide precipitation. Such attempts have included sequestering of ferric acid in acid solution using salicylic acid or sulfosalicylic acid proposed. However, sulfosalicylic acid has been found ineffective in preventing iron asphaltene sludge in 15% hydrochloric acid. Use of sequestering agents such as citric acid, ethylene diamine tetra-acetic acid (EDTA) or nitrilo triacetic acid (NTA) has been described. However, effectiveness of such materials at temperatures above 125–250° F. is poor. Other compounds which have been described include ascorbic acid, erythorbic acid and/or their salts. However, tests have shown that effectiveness of erythorbates at preventing iron precipitates drops off rapidly as hydrochloric acid strength increases to 15%. Furthermore erythorbates are unstable in hydrochloric acid and degrade fairly rapidly to solids. The rate of degradation increases dramatically at higher temperatures, raising particular problems for treatments in which acid remains at reservoir temperatures for several hours, such as staged acid treatments.

Many reducing agents such as stannous ion, hydrazine and related compounds etc. may cause asphaltic sludge even in the absence of irons. Other reducing agents such as erythorbates, and most organic compounds, are typically degraded to varying degrees in strong acid. This degradation may form carbonaceous residues which are ineffective in controlling gradual contamination by iron. Materials such as thiosulphates may degrade in acid to form elemental sulphur precipitates, and are thereof undesirable. An alternative to these reducing agents consists of phosphinic acid (hypophosphorous acid) and/or salts of phosphinic acid.

SUMMARY OF THE INVENTION

Disclosed are compositions and methods for controlling iron precipitation and additive incompatibility during conditions encountered during well operations utilizing acid. These disclosed methods and compositions include the use of antimony and other co-catalysts with a select reducing agent to obtain the reduction of ferric iron to ferrous iron and reducing or substantially preventing precipitation products during well acid treatments. Advantageously, using the disclosed antimony co-catalyst/s with one or more other catalytic agents results in maximum reduction of ferric iron by reducing agent during acid treatments. Furthermore the disclosed antimony co-catalyst/s may be used to accelerate reduction of ferric irons so as to provide an extremely effective means of addressing iron precipitation problems.

Significantly, the disclosed combination of co-catalyst offer advantages over catalytic agents which have been found ineffective alone in catalyzing the action of reducing agents in strong acid. Such catalytic agents include cobalt salts, ferrous iron, iodide salts etc. Advantageously, the disclosed antimony/copper co-catalyst may be employed with phosphinic acid-based reducing systems in strong acids or blends of strong acids including, but not limited to, hydrochloric acids blends having a strength up to about 15% in water. The disclosed antimony-based reducing systems may be formulated and used to provide a relatively fast reduction time for ferric ions, Fe(III).

Numerous advantages are offered by the disclosed methods and compositions. These include improvements in protection of tubulars, including coiled tubing, and sour and/or high temperature downhole environments. By allowing the minimization of copper amounts present in acid treatments employing phosphinic/copper based iron control systems in sour wells, depositing of copper sulfide may be reduced or substantially prevented. Furthermore, the disclosed antimony-containing phosphinic acid-based reducing systems may be used to provide effective sludge control and may serve to improve the function of corrosion inhibitors. Further advantageously, a combination of antimony, copper and iodide ions may be used in high acid concentrations to obtain effective sludge control.

In one respect, disclosed is a process of reducing sludge formation during acid treatment of subterranean formation with a treatment acid, comprising adding to the acid solution used for such treatment:

a) at least one of (i) phosphinic acid and (ii) a salt thereof which is soluble in the acid used for treating the formation which does not precipitate during the treatment, and b) catalytic amount of antimony salts in combination with cupric or cuprous ions in a form soluble in the treatment acid, and wherein the antimony/copper are added as salt which do not form a sludge or precipitate with oil in the subterranean formation. An optional co-catalytic amount of iodide ions may be added to enhance the reduction of ferric iron to ferrous iron. Iodide ions may be added in a form soluble in the treatment acid and may comprise potassium iodide.

In another respect, disclosed is the use of trivalent and/or pentavalent antimony, cuprous and/or cupric salts combined with phosphinic acid and/or its salts to significantly improve the rate of ferric ion reduction over systems employing combinations of cuprous and/or cupric salts with phosphinic acid and/or its salts but without antimony ions. Advantageously, this improvement in ferric ion reduction rate may be used to minimize iron sludging problems. Furthermore, use of antimony materials with copper materials acts to reduce or substantially prevent copper plating which may occur under some conditions in which phosphinic/copper ion-only systems are employed in acids for iron control. For example, such copper plating may be a particular problem in relatively lower strength acids, such as acids having a strength equivalent to or less than 15% hydrochloric acid.

In another respect, disclosed is a method of treating a well, including introducing a well treatment fluid into the well, the well treatment fluid including treatment acid; at least one of phosphinic acid, salt of phosphinic acid, or a mixture thereof; source of antimony ions; and source of copper ions; and in which the antimony ions and the copper ions are present in the well treatment fluid in amounts effective to co-catalyze reduction of ferric iron to ferrous iron. Advantageously, the presence of the antimony and copper ions in the well treatment fluid may be used to reduce or substantially prevent formation of iron precipitation products during the well treatment, and/or to reduce or substantially prevent plating of copper on wellbore tubulars during the well treatment. In one embodiment, the treatment acid may include at least one of hydrochloric acid, hydrofluoric acid, acetic acid, formic acid, sulfamic acid, phosphoric acid, or a mixture thereof. In various embodiments, the source of antimony ions may be at least one of antimony acetate, antimony trichloride, antimony potassium tartrate, potassium pyroantimonate, antimony pentachloride, or a mixture thereof; may be at least one of antimony acetate, antimony trichloride, potassium pyroantimonate, or a mixture thereof; or may be potassium pyroantimonate. In another embodiment, the source of copper ions may be at least one of cupric sulfate, cupric chloride, cuprous chloride, or a mixture thereof. It will be understood that these embodiments may be employed with any of the other embodiments described elsewhere herein. If so desired, any of the embodiments described herein may also include a source of iodide ions such as potassium iodide, in which the iodide ions may be present in the well treatment fluid in an amount effective to co-catalyze reduction of ferric iron to ferrous iron. In one embodiment, the presence of antimony, copper and iodide ions in a well treatment fluid may be used to reduce or substantially prevent formation of iron precipitation products during the well treatment.

In one exemplary embodiment, the phosphinic acid, phosphinic acid equivalent of any phosphinic acid salt present, or mixture thereof may be present in the well treatment fluid in an amount of from about 2 to about 100 Kg per cubic meter of the well treatment solution; and the antimony ions may be present in the well treatment fluid in an amount from about 0.5% to about 40% by weight of the total weight of phosphinic acid and phosphinic acid equivalent of any phosphinic acid salt present. Furthermore, copper ions may be present in the well treatment fluid in an amount from about 0.5% to about 40% by weight of the total weight of phosphinic acid and phosphinic acid equivalent of any phosphinic acid salt present. Still further the well treatment fluid may further include a source of iodide ions, and in which the iodide ions may be present in the well treatment fluid in an amount of from about 0.5% to about 40% by weight of the total weight of phosphinic acid and phosphinic acid equivalent of any phosphinic acid salt present.

In yet another respect, disclosed is a method of treating a well with a well treatment fluid in which the well penetrates a subterranean formation and oil may be present within at least one of the well or the subterranean formation. The method includes combining the following to form a well treatment fluid: treatment acid, at least one of phosphinic acid, a salt of phosphinic acid, or a mixture thereof, source of trivalent or pentavalent antimony ions, source of cuprous or cupric ions, and the well treatment is introduced into the well. The antimony ions and the copper ions may be present in the well treatment fluid in amounts effective to co-catalyze reduction of ferric iron to ferrous iron. In one embodiment, the phosphinic acid, salt of phosphinic acid, or mixture thereof may be soluble in the acid used for treating the formation and does not form a precipitate during the well treatment; the source of trivalent or pentavalent antimony ions and the source of cuprous or cupric ions may be in a form soluble in the treatment acid and may be combined with the treatment acid as salts which do not form a sludge or precipitate with the oil in the subterranean formation. The source of trivalent antimony ions may include antimony acetate, antimony trichloride, antimony potassium tartrate, or a mixture thereof; and the source of pentavalent antimony ions may include potassium pyroantimonate, antimony pentachloride, or a mixture thereof. The source of cupric ions may include cupric sulfate or cupric chloride; and the source of cuprous ions may include cuprous chloride. In one exemplary embodiment, the source of antimony ions may include antimony acetate, antimony trichloride, potassium pyroantimonate, or a mixture thereof; and the source of copper ions may include cupric sulfate.

In various exemplary embodiments, amounts of the components may be selected or varied within given ranges. For example, the antimony ions may be present in the well treatment fluid in an amount of from about 0.5% to about 40% by weight of the total weight of phosphinic acid and phosphinic acid equivalent of any phosphinic acid salt present; and the phosphinic acid, phosphinic acid equivalent of any phosphinic acid salt present, or mixture thereof may be present in the well treatment fluid in an amount of from about 2 to about 100 Kg per cubic meter of the well treatment fluid. The trivalent or pentavalent antimony ions may be present in the well treatment fluid in an amount of from about 0.5% to about 20% by weight of the total weight of phosphinic acid and phosphinic acid equivalent of any phosphinic acid salt present; and the phosphinic acid, phosphinic acid equivalent of any phosphinic acid salt present, or mixture thereof may be present in the well treatment fluid in an amount of from about 2 to about 50 Kg per cubic meter of the well treatment fluid. The cuprous or cupric ions may be present in the well treatment fluid in an amount of from about 0.5% to about 40% by weight of the total weight of phosphinic acid and phosphinic acid equivalent of any phosphinic acid salt present; and the phosphinic acid, phosphinic acid equivalent of any phosphinic acid salt present, or mixture thereof may be present in the well treatment fluid in an amount of from about 2 to about 100 Kg per cubic meter of the well treatment fluid. The cuprous or cupric ions may be present in the well treatment fluid in an amount from about 0.5% to about 40% by weight of the total weight of phosphinic acid and phosphinic acid equivalent of any phosphinic acid salt present; and the phosphinic acid, phosphinic acid equivalent of any phosphinic acid salt present, or mixture thereof may be present in the well treatment fluid in an amount of from about 2 to about 50 Kg per cubic meter of the well treatment fluid. The cuprous or cupric ions may be present in the well treatment fluid in an amount of from about 0.5% to about 40% by weight of the total weight of phosphinic acid and phosphinic acid equivalent of any phosphinic acid salt present. In any of these embodiments, the combining further may include combining a source of iodide ions to result in iodide ions present in the well treatment fluid in an amount effective to co-catalyze reduction of ferric iron to ferrous iron; and the source of iodide ions may be in a form soluble in the treatment acid. For example, in one exemplary embodiment, the combining further may include combining a source of iodide ions to result in iodide ions present in the well treatment fluid in an amount effective to co-catalyze reduction of ferric iron to ferrous iron; the source of iodide ions may be in a form soluble in the treatment acid; and the iodide ions may be present in the well treatment fluid in an amount of from about 0.5% to about 40% by weight of the total weight of phosphinic acid and phosphinic acid equivalent of any phosphinic acid salt present. It will be understood that various combinations of components using any combination/s of the given ranges of these exemplary embodiments are possible. In one exemplary embodiment, the combining further may include combining a source of iodide ions to result in iodide ions present in the well treatment fluid in an amount effective to co-catalyze reduction of ferric iron to ferrous iron; the source of iodide ions may be in a form soluble in the treatment acid; and the source of iodide ions may include potassium iodide. Further, the treatment acid may be at least one of 1–34% hydrochloric acid, hydrofluoric acid, acetic acid, formic, sulfamic acid, phosphoric acid, or a mixture thereof.

In yet another respect, disclosed is a method of treating a well with a well treatment fluid in which the following components are combined to form a well treatment fluid and introduced into a well: treatment acid including at least one of 1–34% hydrochloric acid, hydrofluoric acid, acetic acid, formic acid, sulfamic acid, phosphoric acid, or a mixture thereof; from about 2 Kg to about 100 Kg per cubic meter of well treatment fluid of at least one of phosphinic acid, a salt of phosphinic acid, or a mixture thereof that may be soluble in the acid and which does not form a precipitate during the treating of the well; from about 0.5% to about 40% by weight of the total weight of phosphinic acid and phosphinic acid equivalent of any phosphinic acid salt present, of a source of antimony ions that may be at least one of antimony acetate, antimony trichloride, antimony pentachloride, potassium pyroantimonate, potassium antimony tartrate, or a mixture thereof; from about 0.5% to about 40% by weight of the total weight of phosphinic acid and phosphinic acid equivalent of any phosphinic acid salt present, of a source of copper ions that may be at least one of $CuSO_4$, $CuCl_2$, CuCl, or a mixture thereof In one embodiment, the combining further may include combining a source of iodide ions to result in iodide ions present in the well treatment fluid in an amount effective to co-catalyze reduction of ferric iron to ferrous iron; and the source of iodide ions may be in a form soluble in the treatment acid. The well may penetrate a subterranean formation, oil may be present within at least one of the well or the subterranean formation, and the source of iodide ions may be in a form that is soluble in the treatment acid and that does not form a sludge or precipitate with the oil. The iodide ions may be present in the well treatment fluid in an amount of from about 0.5% to about 40% by weight of the total weight of phosphinic acid and phosphinic acid equivalent of any phosphinic acid salt present, and the source of iodide ions may be, for example, potassium iodide. In one exemplary embodiment, the source of antimony ions may be antimony acetate, potassium pyroantimonate, or a mixture thereof; and the source of copper ions may be $CuSO_4$. In another exemplary embodiment, the source of antimony ions may be antimony acetate, potassium pyroantimonate, or a mixture thereof; the source of copper ions may be $CuSO_4$; and the source of iodide ions may be potassium iodide.

DESCRIPTION OF ILLUSTRATIVE EMBODIMENTS

In the practice of the disclosed methods and compositions, suitable sources of antimony and copper ions include, but are not limited to, antimony and copper salts having some solubility in the particular acid or blend of acid chosen. In addition to antimony and copper salts, organo-metallic compounds may also be employed as sources of antimony and copper ions. It will be understood with benefit of this disclosure, that combinations of multiple antimony and/or copper sources may be employed including mixtures of different salts and mixtures and salts and organo-metallic compounds.

The disclosed antimony-based reducing systems may be formulated by combining a source of antimony ions with phosphinic acid-based reducing systems and treatment acids such as those described in Canadian Patent No. 1278178 and U.S. Pat. No. 5,063,997, which are incorporated by reference herein in their entirety. The disclosed compositions may be employed for reducing iron precipitation using operational methods described in these references.

Suitable sources of antimony ions include, but are not limited, trivalent antimony salts such as Sb $(CH_3COO)_3$, $SbCl_3$, $Sb_2K_2O_{12}C_8H_4.3H_2O$, $SbKO_6C_4H_2 \bullet H_2O$, and mixtures thereof. Other suitable sources of antimony ions include, but are not limited to, pentavalent antimony salts, $SbCl_5$ and $Sb_2K_2H_2O_7 \bullet 4H_2O$, etc., and mixtures thereof Suitable sources of copper ions include, but are not limited to, divalent copper (e.g., $CuSO_4$, $CuCl_2$), monovalent copper (e.g., $CuCl_2$), etc., and mixtures thereof These particular compounds are typically relatively inexpensive, and are generally easily available. Specific examples of other suitable sources of copper ions include CuO, $CuNO_3$, etc. However, with benefit of this disclosure, it will be understood by those of skill in the art that other sources of antimony or copper ions may be employed.

It will be understood with benefit of this disclosure by those of skill in the art that under some circumstances and/or concentrations certain salts may have a tendency to form a sludge or precipitate with certain formation fluids. However, it will also be understood that such salts may still be advantageously employed in the disclosed method when used in amounts that result in ion concentration levels below those at which significant sludge or precipitate formation occurs. For example, in some situations sulfate salts of copper form calcium sulfate precipitation on spending. However, when used in appropriately small amounts, such sludge or precipitation formation may be minimal or substantially non-existent, and sulfate salts of copper may be an acceptable or preferred source of copper ions. With benefit of this disclosure, those of skill in the art will understand that acceptable concentrations of such salts may be determined by fluid analysis methods such as those detailed in the Examples herein, or by using analysis methods that are known in the art.

An optional source of iodide ions may also be employed in an antimony-containing phosphinic acid-based reducing system. The addition of iodide ions typically improves or enhances co-catalytic effect of antimony and copper ions in a phosphinic acid-based reducing system. This enhancement is typically most significant in acids or blends of acids with strengths approximately equivalent to 15% hydrochloric acid or greater. However, enhanced catalytic effects may be obtained with iodide ions in acid or acid blends having lower strengths as well. Suitable sources of iodide ions include, but are not limited to, any iodide compound or complex (including organic iodides). Typically such an iodide compound or complex is selected which does not itself lead to sludge formation and which is capable of liberating iodide ions in oil. Examples of suitable sources of iodide ions include, but are not limited to, potassium iodide, ammonium idodide, antimony idodide, ethylenediamine dihydriodide, and mixtures thereof.

In one embodiment, treatment acid is combined with at least one of phosphinic acid, salt of phosphinic acid, or a mixture thereof; a source of antimony ions; a source of copper ions and any other desired additive/s to form a treatment fluid. The disclosed methods and compositions are effective at preventing sludge formations in wells treated with many common well treating acids, including, but not limited to, hydrochloric acid, acetic acid, formic acid, hydrofluoric acid, sulfuric acid, phosphoric acid, and mixtures thereof. In one exemplary embodiment, the disclosed method may be practiced with mixtures of hydrochloric and hydrofluoric acids commonly referred to as "mud acids". In another exemplary embodiment, the disclosed method may be practiced with 1–34% hydrochloric acid.

With benefit of this present disclosure, those of skill in the art will understand that particular well treatment fluids may be formulated so as to avoid solubility problems. For example, calcium phosphonite or phosphinic acid are typically preferred over sodium salt of phosphinic acid for use in 28% hydrochloric acid due to the potential for precipitation of sodium chloride. Similarly, ammonium salt phosphinic acid or phosphinic acid is typically employed with hydrofluoric acid solutions to minimize the formation of insoluble fluorosilicate which may occur upon spending on silicates. One source of sodium hypophosphite is known as "NOWFERR 1," and is available from Nowsco.

It will also be understood with benefit of this disclosure that well treatment fluids may be modified by addition of one or more optional additives or agents known in the acidizing art to provide, for example, gelled acid, emulsified acids, gasified acid, foamed acid, alcoholic acid, etc. In turn, these acids may be formulated and used in a variety of acidizing techniques known to those of skill in the art.

Well treatment fluids may be formulated according to the disclosed method by combining treatment acid; phosphinic acid, salt of phosphinic acid or a mixture thereof; source of antimony ions; source of copper ions; source of optional iodine ions and other optional additives or agents using any suitable method known in the art. As used herein, the term "combining" refers to any method suitable for admixing, exposing, or otherwise causing two or more materials, compounds, or components to come together in a manner sufficient to cause at least partial mixing to occur between the components.

In the formulation of the disclosed antimony-containing phosphinic acid-based reducing systems, phosphinic acid or a salt thereof may be used in any amount suitable for reduction of sludging. In this regard, there is essentially no lower limit to the amount of phosphinic acid which may be used. Even small or trace amounts typically have beneficial effect on reducing sludging. However, it will be understood that the beneficial effects of phosphinic acid will typically increase as the concentration of phosphinic acid or salt thereof is increased. Although not necessary, it is often desirable to determine the optimum concentration of phosphinic acid to be employed in the reduction system by carrying out an iron sludge test on the particular crude oil with which a system is to be used. In some situations it may be the case that beyond a certain concentration, additional phosphinic acid will yield diminishing returns or no improvement in anti-sludging benefits. In one embodiment, phosphinic acid may be present in a well treatment fluid in a concentration up to about 50 kilograms, alternatively from about 2 Kg to about 50 Kg of phosphinic acid per cubic meter of well treatment fluid. In another embodiment typically employed where severe sludging problems exist, phosphinic acid may be present in an amount of up to 100 Kg, alternatively from about 2 Kg to about 100 Kg of phosphinic acid per cubic meter of well treatment fluid.

In the practice of the disclosed method, phosphinic acid may be replaced by a soluble, for example a soluble phosphinic salt, such as sodium phosphanate. In such a case, it is typically desirable to ensure that the metal ion of the salt does not give rise to an insoluble precipitate with other compounds present in the acid or the components of the crude oil. Visual inspection of acid in a sludging test as set out in the example section of U.S. Pat. No. 5,063,997 may be carried out to ensure that this is not the case.

A desired concentration of antimony ions in a well treatment fluid may be achieved by adding or combining a suitable amount of a source of antimony ions (including trivalent and/or pentivalent antimony compounds) with other components of an aqueous, acid-containing well treatment fluid. In one exemplary embodiment, antimony and copper salts are combined with sodium phosphonite and hydrochloric acid. In this embodiment, sodium phosphonite may be combined along with other desired additives in an aqueous base, such as dilution water. Other desired additives may include, but are not limited to, corrosion inhibitors, non-emulsifying agents, anti-sludging agents, etc. Concentrated hydrochloric acid may then be combined with the aqueous base in an amount sufficient to obtain a hydrochloric acid solution of desired strength. Antimony and copper salts may then be added to complete the well treatment fluid. It will be understood with benefit of this disclosure that the preceding method of mixing represents just one exemplary embodiment, and that variations in the mixing procedure, including order or component addition, may be made.

Concentrations of antimony and copper ions used in well treatment fluids with phosphinic acid-based reducing systems may vary greatly. In this regard, any concentrations of antimony and copper ions suitable for co-catalyzing the reduction of ferric iron in an acid treatment system comprising phosphinic acid-based reducing system may be employed. Even very small concentrations relative to the phosphinic acid content may provide beneficial effects. In this regard, small concentrations of these ions may be particularly effective when used in a well environments having temperatures greater than about 100° C. In such cases, concentrations of antimony, cupric or cuprous ions as low as about 0.5% of the weight of phosphinic acid (or its equivalent in phosphinic salt) present in the reducing system may be employed. Although not necessary, at lower temperatures larger concentrations of antimony and/or copper ions may be desirable. Furthermore, although not necessary, it may be desirable to test the particular crude oil present in a well to be treated using the disclosed method and compositions, to ensure that no sludging results from the presence of antimony or copper ions which are selected for use.

Antimony ions and copper ions may be present in any amounts suitable for co-catalyzing reduction of ferric ions. In one embodiment, antimony ions may be present in an amount of from about 0.5% to about 40%, alternatively from about 5% to about 40%, alternatively from about 0.5% to about 20%, and further alternatively from about 5% to about 20% by the total weight of phosphinic acid and phosphinic acid equivalent of any phosphinic acid salt present in a well treatment fluid. These are exemplary concentrations and it will be understood with benefit of this disclosure that greater or lesser amounts of antimony ions may be present. In this regard, it may be optionally desirable to test the particular crude oil to which the acid treatment fluid will be exposed to ensure that no sludging results from the presence of an amount of antimony ions which is desired to utilize in a well treatment fluid.

Copper ions may be present in the disclosed well treatment fluids in an amount of from about 0.5% to about 40%, alternatively from about 5% to about 40%, further alternatively from about 0.5% to about 20%, and further alternatively from about 5% to about 20% by weight of the total weight of phosphinic acid and phosphinic acid equivalent of any phosphinic acid salt present in the well treatment fluid. It will be understood that greater or lesser amounts of copper ions may be present in the disclosed well treatment fluids. It may be optionally desirable to test the particular crude oil with which the well treatment fluid is to be exposed in order to ensure that no sludging results from the presence of the amount of copper ions which it is desired to add. It will be understood with the benefit of the present disclosure that copper ions may be added as cupric or cuprous salts.

In those cases where acids or blends of acids with approximate strengths equivalent to or greater than 15% hydrochloric acid are employed, it may be particularly desirable to add a source of iodide ions to a acid-containing well treatment fluid. In this regard, the iodide ions serve to increase the speed and degree of the reduction of ferric ions and, therefore, sludge prevention. In such cases, the speed and degree of reduction of ferric iron is typically related to the amount of iodide ion present in the acid-containing well treatment fluid. In this regard, the desired amount of iodide ion may vary with temperature, acid strength and the nature of the crude oil to which an acid-containing well treatment fluid will be exposed.

With benefit of the present disclosure, a well treatment fluid may be formulated with components described elsewhere herein using any suitable method known in the art. For example, in one exemplary embodiment for a hydrochloric acid-based treatment fluid employing antimony/copper salts and sodium phosphonite, sodium phosphonite is typically mixed along with the other additives into the dilution water for concentrated hydrochloric acid. Such additives may include, but are not limited to, corrosion inhibitors, non-emulsifying agents, anti-sludging agents, etc. Concentrated acid is then typically added to arrive at a hydrochloric acid solution of the desired strength. The antimony/copper salts are then added and once dissolved, the thus-formed well treatment fluid may be introduced into a well and/or subterranean formation. As used herein, the term "introducing" means pumping, injecting, pouring, releasing, displacing, spotting, circulating, or otherwise placing a fluid or material within a well, well bore or subterranean formation using any suitable manner known in the art. Furthermore, while this method of mixing has been found suitable, variations of mixing procedure may be made without detracting from the utility of the disclosed method.

EXAMPLES

The following examples are illustrative and should not be construed as limiting the scope of the disclosed invention or claims thereof.

In the Examples, the following abbreviations are employed:

"SP"=Sodium Hypophosphite, $NaH_2PO_2 \cdot H_2O$
"HP"=Hypophosphinic acid, 50% $H_3PO_2$
"ATC"=Antimony Trichloride, $SbCl_3$
"AAC"=Antimony Acetate, $Sb(CH_3COO)_3$
"PYA"=Potassium Pyroantimonate, $Sb_2K_2H_2O_7 \cdot 4H_2O$ Example 1

The utility and effectiveness of the disclosed method and compositions is demonstrated by quantitative ion preipitation data shown in Table 1.

Table 1 contains data from examples of the disclosed method employed with iron sensitive Duprew crude oil from a Canadian formation. In each case, 15% hydrochloric acid was employed with varying amounts of iron and varying amounts and types of antimony and copper ion sources. The 15% hydrochloric acid blends each also contained 20 liters per cubic meter of a n anti-sludging/non-emulsifier known as "NOWFERR 10", which is a commercial product available from Nowsco Well Service Ltd. As described previously, choice of other optional additives which may be added to a well treatment fluid typically depends upon the nature of the oil being tested and the results desired. If desired, compatibility testing may be employed in order to arrive at an optimum concentration and combination of additives. Such additives may include, but are not limited to, corrosion inhibitors, non-emulsifiers and anti-sludging additives, such as those with composition and availability known in the art of well treating.

In this example, an iron sludge test procedure was employed as follows:
Mix additives in 50 mls of acid in a 250 ml glass bottle.
Add iron solution to the mix.
After 3 minutes, add 50 mL of crude oil.
Shake vigorously for two minutes.
Place in water bath at 85° C. for 30 minutes.
Observe the formation of sludge layers.
Vacuum filter on preweighed 200-mesh screen.
Wash with diesel fuel followed by pentane.
Vacuum oven dry and then reweigh.

TABLE 1

Iron Sludge Results with Duprew Canadian Crude

| Test | HCl % | Fe g/L | SP Kg/m3 | CuSO4 Kg/m3 | KI L/m3 | AAC Kg/m3 | PYA L/m3 | Break Time Min | Amount of Sludge mg |
|---|---|---|---|---|---|---|---|---|---|
| 1 | 15 | | | | | | | 6 | 80 |
| 2 | 15 | 5 | | | | | | 7 | 320 |
| 3 | 15 | | 21 | | 7 | | | 1:40 | 85 |
| 4 | 15 | 5 | 21 | | 7 | | | 1:40 | 110 |
| 5 | 15 | | 21 | 0.6 | 7 | | | 1:30 | 15 |
| 6 | 15 | 5 | 21 | 0.6 | 7 | | | 1:40 | 15 |
| 7 | 15 | | 21 | 1.2 | 7 | | | 1:25 | <5 |
| 8 | 15 | 5 | 21 | 1.2 | 7 | | | 1:30 | <5 |
| 9 | 15 | | 21 | 0.6 | 7 | | | 1:20 | <5 |
| 10 | 15 | 5 | 21 | 0.6 | 7 | 1.8 | | 1.04 | <5 |
| 11 | 15 | 10 | 21 | 0.6 | 7 | 1.8 | | 1.04 | <5 |
| 12 | 15 | | 21 | 1.2 | 7 | 1.8 | | 1.35 | <5 |
| 13 | 15 | 5 | 21 | 1.2 | 7 | 1.8 | | 0.45 | <5 |
| 14 | 15 | 10 | 21 | 1.2 | 7 | 1.8 | | 0.40 | <5 |
| 15 | 15 | | 21 | 0.6 | 7 | | 2 | 1:35 | <5 |
| 16 | 15 | 5 | 21 | 0.6 | 7 | | 2 | 1:33 | <5 |
| 17 | 15 | | 21 | 0.6 | 7 | | 2 | 1:33 | <5 |
| 18 | 15 | | 21 | 1.2 | 7 | | 2 | 1:20 | <5 |
| 19 | 15 | 5 | 21 | 1.2 | 7 | | 2 | 0.58 | <5 |
| 20 | 15 | 10 | 21 | 1.2 | 7 | | 2 | 1:00 | <5 |

From the data in Table 1, it may be seen that the addition of antimony ions to a test solution typically results in reduction or substantial prevention of iron sludge, and/or typically reslts in decreased break time. For example, comparing the results of tests 5 and 6 with respective tests 9 and 10 and tests 15 and 16, the following observations may be made. Tests 9 and 10 (using antimony acetate) and tests 15 and 16 (using potassium pyroantimonate) resulted in measured sludge amounts of less than 5 milligrams, as compared to the sludge amount of 15 milligrams observed in tests 5 and 6 (comparable solutions lacking antimony ions). Furthermore, it may be seen for tests 9 and 10 that sludge break time was less than for tests 5 and 6.

In addition, runs 11 and 17 demonstrate that the presence of antimony ions results in a measured sludge amount of less than 5 milligrams, even when up to 10 grams per liter of iron is added to the mixture. Similar results may be noted by comparing tests 7–8 with tests 12–14 (using antimony acetate) and tests 18–20 (using potassium pyroantimonate).

In each of tests 7–8, 12–14 and 18–20, an increased amount of copper sulfate CuSO4 was present. Although measured sludge for each of these runs was less than 5 milligrams, it may be seen that when antimony ions were present, break time was typically reduced. As previously mentioned, increased reduction of ferric iron is important as it reduces the opportunity for the ferric iron to form sludge with other components present. Break time in Table 1 corresponds to iron reduction time. Therefore, the on average reduced break times seen for those solutions containing antimony advantageously translates into reduced potential for sludge formation.

Example 2

The data in Table 2 represents iron reduction time measured for solutions prepared according to the procedure of Example 1. In each case, absolution of 15% hydrochloric acid was combined with other components under the temperature conditions noted. Iron reduction time was then measured by a timer. In this regard, change in solution color from red to colorless is indicative of complete reduction of ferric to ferrous ions.

Referring to Table 2, tests 6–13 represents solutions containing only copper and iodide ions. Tests 14–21 include a source of trivalent antimony ions (antimony acetate). As may be seen from the data of Table 2, iron reduction time was significantly reduced for most of the solutions containing antimony ions. This was true for both 5 grams per liter and 10 grams per liter amounts of added iron, and at temperatures of 22° C. and 80° C. Similar results may be seen when comparing tests 6–13 with tests 22–29 (containing antimony trichloride) and tests 30–37 (containing potassium pyroantimonate).

TABLE 2

Iron Reduction Using Antimony/Copper as a Catalyst in 15% Hydrochloric Acid

| Test | SP Kg/m3 | CuSO4 Kg/m3 | KI L/m3 | AAC Kg/m3 | AC Kg/m3 | PYA L/m3 | Fe g/L | Temp ° C. | Reduction Time Min. |
|---|---|---|---|---|---|---|---|---|---|
| 1 | 21 | | 7 | | | | 5 | 22 | >60 |
| 2 | 21 | | 7 | | | | 5 | 80 | >60 |
| 3 | 21 | | 7 | | | | 10 | 22 | >60 |
| 4 | 21 | | 7 | | | | 10 | 80 | >60 |
| 6 | 21 | 0.6 | 7 | | | | 5 | 22 | 7:39 |
| 7 | 21 | 0.6 | 7 | | | | 5 | 80 | 2:05 |

TABLE 2-continued

Iron Reduction Using Antimony/Copper as a Catalyst in 15% Hydrochloric Acid

| Test | SP Kg/m3 | CuSO4 Kg/m3 | KI L/m3 | AAC Kg/m3 | AC Kg/m3 | PYA L/m3 | Fe g/L | Temp °C. | Reduction Time Min. |
|---|---|---|---|---|---|---|---|---|---|
| 8 | 21 | 1.2 | 7 | | | | 5 | 22 | 5:01 |
| 9 | 21 | 1.2 | 7 | | | | 5 | 80 | 1:41 |
| 10 | 21 | 0.6 | 7 | | | | 10 | 22 | >60 |
| 11 | 21 | 0.6 | 7 | | | | 10 | 80 | 5.09 |
| 12 | 21 | 1.2 | 7 | | | | 10 | 22 | 14.06 |
| 13 | 21 | 1.2 | 7 | | | | 10 | 80 | 3.53 |
| 14 | 21 | 0.6 | 7 | 1.8 | | | 5 | 22 | 4:41 |
| 15 | 21 | 0.6 | 7 | 1.8 | | | 5 | 80 | 1:52 |
| 16 | 21 | 1.2 | 7 | 1.8 | | | 5 | 22 | 3:32 |
| 17 | 21 | 1.2 | 7 | 1.8 | | | 5 | 80 | 1:18 |
| 18 | 21 | 0.6 | 7 | 1.8 | | | 10 | 22 | 8:47 |
| 19 | 21 | 0.6 | 7 | 1.8 | | | 10 | 80 | 4:10 |
| 20 | 21 | 1.2 | 7 | 1.8 | | | 10 | 22 | 6:12 |
| 21 | 21 | 1.2 | 7 | 1.8 | | | 10 | 80 | 2:18 |
| 22 | 21 | 0.6 | 7 | | 1.8 | | 5 | 22 | 5:28 |
| 23 | 21 | 0.6 | 7 | | 1.8 | | 5 | 80 | 1:52 |
| 24 | 21 | 1.2 | 7 | | 1.8 | | 5 | 22 | 3:08 |
| 25 | 21 | 1.2 | 7 | | 1.8 | | 5 | 80 | 1:24 |
| 26 | 21 | 0.6 | 7 | | 1.8 | | 10 | 22 | 8:36 |
| 27 | 21 | 0.6 | 7 | | 1.8 | | 10 | 80 | 3:58 |
| 28 | 21 | 1.2 | 7 | | 1.8 | | 10 | 22 | 9:06 |
| 29 | 21 | 1.2 | 7 | | 1.8 | | 10 | 80 | 2:27 |
| 30 | 21 | 0.6 | 7 | | | 40 | 5 | 22 | 4:41 |
| 31 | 21 | 0.6 | 7 | | | 40 | 5 | 80 | 3:22 |
| 32 | 21 | 1.2 | 7 | | | 40 | 5 | 22 | 3:06 |
| 33 | 21 | 1.2 | 7 | | | 40 | 5 | 80 | 1:19 |
| 34 | 21 | 0.6 | 7 | | | 40 | 10 | 22 | 8:10 |
| 35 | 21 | 0.6 | 7 | | | 40 | 10 | 80 | 3:22 |
| 36 | 21 | 1.2 | 7 | | | 40 | 10 | 22 | 7:10 |
| 37 | 21 | 1.2 | 7 | | | 40 | 10 | 80 | 2:10 |

Example 3

In this example, test solutions were made up using 28% hydrochloric acid in a manner similar to that described for Example 1. As may be seen from the data in Table 3, iron reduction times of greater than about 30% were observed for those test solutions containing antimony ions. Iron reduction times were measured in a manner similar to that described for Example 2.

TABLE 3

Iron Reduction Using Antimony/Copper as a Catalyst in 28% Hydrochloric Acid

| Test | HCl % | HP L/m3 | SP Kg/m3 | CuSO4 Kg/m3 | KI L/m3 | AAC Kg/m3 | PYA L/m3 | Fe g/L | Temp °C. | Reduction Time Min |
|---|---|---|---|---|---|---|---|---|---|---|
| 1 | 28 | 20 | 10 | 1.2 | 7 | | | 5 | 22 | 6:50 |
| 2 | 28 | 20 | 10 | 1.2 | 7 | | | 5 | 80 | 3:40 |
| 3 | 28 | 20 | 10 | 1.2 | 7 | 1.8 | | 5 | 22 | 4:20 |
| 4 | 28 | 20 | 10 | 1.2 | 7 | 1.8 | | 5 | 80 | 1:30 |
| 3 | 28 | 20 | 10 | 1.2 | 7 | | 40 | 5 | 22 | 4:30 |
| 4 | 28 | 20 | 10 | 1.2 | 7 | | 40 | 5 | 80 | 1:40 |

Example 4

In this example, test solutions were prepared with iron sensitive Duprew Canadian crude in a manner similar to that described in Example 1 in order to evaluate sludge formation. As may be seen in Table 4, those test solutions containing antimony ions exhibited reduced amounts of sludge.

TABLE 4

Iron Sludge Results with Duprew Canadian Crude

| Test | HCl % | HP L/m3 | SP Kg/m3 | CuSO$_4$ Kg/m3 | KI L/m3 | AAC Kg/m3 | PYA L/m3 | Fe g/L | Amount of Sludge mg |
|---|---|---|---|---|---|---|---|---|---|
| 1 | 28 | 20 | 10 | 1.2 | 7 | | | 0 | 84 |
| 2 | 28 | 20 | 10 | 1.2 | 7 | | | 1 | 190 |
| 3 | 28 | 20 | 10 | 1.2 | 7 | 1.8 | | 0 | 46 |
| 4 | 28 | 20 | 10 | 1.2 | 7 | 1.8 | | 1 | 150 |
| 5 | 28 | 20 | 10 | 1.2 | 7 | | 40 | 0 | 39 |
| 6 | 28 | 20 | 10 | 1.2 | 7 | | 40 | 1 | 140 |

Example 5

In Example 5, test solutions were prepared in a manner similar to that described for Example 2 with reduced amounts of phosphinic acid equivalent. Iron reduction times were measured in a manner similar to that described for Example 2.

In this example, it may be seen that substantially reduced iron reduction times were obtained in those test solutions containing antimony ions, even with reduced phosphinic acid concentrations as compared to Example 2.

Example 6

In Example 6, test solutions containing lower strength 7.5% hydrochloric acid were prepared in a manner similar to that described for Example 1, and were evaluated to measure the effect of antimony ions on copper deposition.

Figure 1:
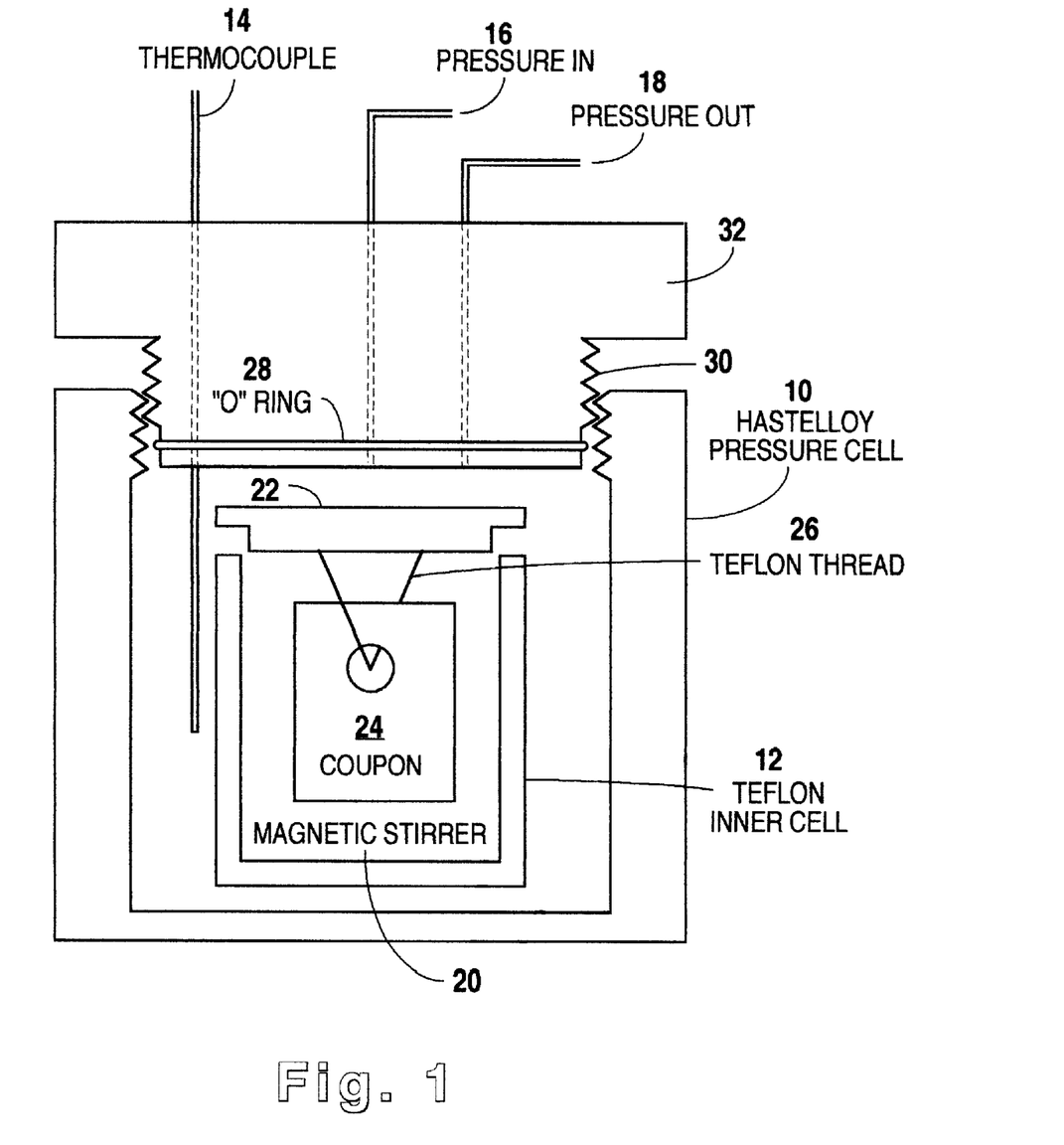
FIG. 1 is a simplified schematic of a corrosion test cell utilized in the procedure of Example 6.

For this example, a corrosion test cell was employed. The test cell consisted of a Hastelloy outer body 10; a Teflon inner chamber 12; a temperature controller (not pictured) and thermocouple 14; a pressure pump (not pictured) and

TABLE 5

Iron Reduction Systems In 15% HCl Containing 10 Kg/m3 Sodium Hypophosphite

| Test | SP Kg/m3 | CuSO$_4$ Kg/m3 | KI L/m3 | AAC Kg/m3 | ATC Kg/m3 | PYA L/m3 | Fe g/L | Temp °C. | Reduction Time Min. |
|---|---|---|---|---|---|---|---|---|---|
| 1 | 10 | | 7 | | | | 5 | 22 | >60 |
| 2 | 10 | | 7 | | | | 5 | 80 | >60 |
| 3 | 10 | | 7 | | | | 10 | 22 | >60 |
| 4 | 10 | | 7 | | | | 10 | 80 | >60 |
| 6 | 10 | 0.6 | 7 | | | | 5 | 22 | 12:36 |
| 7 | 10 | 0.6 | 7 | | | | 5 | 80 | 2:02 |
| 8 | 10 | 1.2 | 7 | | | | 5 | 22 | 9:08 |
| 9 | 10 | 1.2 | 7 | | | | 5 | 80 | 1:58 |
| 10 | 10 | 0.6 | 7 | | | | 10 | 22 | 54:53 |
| 11 | 10 | 0.6 | 7 | | | | 10 | 80 | 5:08 |
| 12 | 10 | 1.2 | 7 | | | | 10 | 22 | 37:25 |
| 13 | 10 | 1.2 | 7 | | | | 10 | 80 | 3:41 |
| 14 | 10 | 0.6 | 7 | 1.8 | | | 5 | 22 | 3:38 |
| 15 | 10 | 0.6 | 7 | 1.8 | | | 5 | 80 | 1:25 |
| 16 | 10 | 1.2 | 7 | 1.8 | | | 5 | 22 | 2:59 |
| 17 | 10 | 1.2 | 7 | 1.8 | | | 5 | 80 | 1:21 |
| 18 | 10 | 0.6 | 7 | 1.8 | | | 10 | 22 | 16:17 |
| 19 | 10 | 0.6 | 7 | 1.8 | | | 10 | 80 | 3:44 |
| 20 | 10 | 1.2 | 7 | 1.8 | | | 10 | 22 | 14:40 |
| 21 | 10 | 1.2 | 7 | 1.8 | | | 10 | 80 | 12 |
| 22 | 10 | 0.6 | 7 | | 1.8 | | 5 | 22 | 9.25 |
| 23 | 10 | 0.6 | 7 | | 1.8 | | 5 | 80 | 2.56 |
| 24 | 10 | 1.2 | 7 | | 1.8 | | 5 | 22 | 7:45 |
| 25 | 10 | 1.2 | 7 | | 1.8 | | 5 | 80 | 2:08 |
| 26 | 10 | 0.6 | 7 | | 1.8 | | 10 | 22 | >60 |
| 27 | 10 | 0.6 | 7 | | 1.8 | | 10 | 80 | 10.26 |
| 28 | 10 | 1.2 | 7 | | 1.8 | | 10 | 22 | >60 |
| 29 | 10 | 1.2 | 7 | | 1.8 | | 10 | 80 | 9:37 |
| 30 | 10 | 0.6 | 7 | | | 40 | 5 | 22 | 9:31 |
| 31 | 10 | 0.6 | 7 | | | 40 | 5 | 80 | 2:40 |
| 32 | 10 | 1.2 | 7 | | | 40 | 5 | 22 | 6:35 |
| 33 | 10 | 1.2 | 7 | | | 40 | 5 | 80 | 2:31 |
| 34 | 10 | 0.6 | 7 | | | 40 | 10 | 22 | >60 |
| 35 | 10 | 0.6 | 7 | | | 40 | 10 | 80 | >60 |
| 36 | 10 | 1.2 | 7 | | | 40 | 10 | 22 | >60 |
| 37 | 10 | 1.2 | 7 | | | 40 | 10 | 80 | >60 | incoming pressure line 16 and outgoing pressure line 18. A simplified schematic of the assembled apparatus is shown in FIG. 1.

Using the corrosion test cell of FIG. 1, corrosion rate was measured on J-55 grade steel coupons using the following procedure:

Coupon Preparation

Coupons were cut from J-55 tubing samples to provide 4.5 inches squared (29 cm$^2$) surface area. Surface area of each coupon was measured. The coupons were then pickled in 20% HCl for 5 minutes prior to testing. Coupons were then washed with soap and water, rinsed in acetone and oven dried. Coupons were stored in desiccator following preparation. Prior to testing, all surfaces of each coupon were examined using a microscope and any defects noted Coupons were weighed prior to testing.

Acid Blend Preparation 150 milliliters of each individual acid to be tested was prepared. Mix water was reduced equivalent to the volume taken up by additives. Additives employed were: 1. Inhibitors 2. Intensifier 3. Iron Control Additives 3. Non-Emulsifier 4. Mutual Solvent Corrosion Test Procedure For each test, three-quarters of the acid blend to be tested was placed with all additives in the teflon cell 12. A Teflon magnetic stir bar 20 was placed at the bottom of the cell 12. A teflon cap 22 was placed onto the top of cell 12, with the test coupon 24 suspended from the cap 22 using a teflon thread 26. The remaining one-quarter acid is added through cap 22 until full. The teflon cell 12 was carefully placed into the hastelloy outer cell 10.

If the test was to be pressured with mineral oil, then hastelloy cell 10 was filled with mineral oil to just cover teflon cell 12. If the test was to be pressurized with nitrogen, the hastelloy cell 10 was filled with mineral oil to within one-half inch of the top of the teflon cell 12.

Next, "O" ring 28 and threads 30 of Hastelloy cap 32 were coated with a high temperature acid stable grease (Dow Corning 111) prior to tightening. The hastelloy cell cap 32 was then screwed tightly to the outer cell 10. Hastelloy cell 10 was then placed very carefully into heating jacket (not shown) and pressure lines 16 and 18 were attached to pressure pump (not shown) and thermocouple are attached to temperature controller (not shown). The stir rate was set at 2.

For tests pressurized by mineral oil, the pressure pump was started with the drain valve open to allow trapped air to be pumped out of the cell 10. When oil begins to come out of the drain the drain valve is closed and the pressure adjusted to just below the operating pressure (4000 psi). The valve on the discharge of the pump was then closed. The pressure was then released on the pump regulator. Because pressure increases as cell 10 is heated, it was monitored closely until the final test temperature was reached. The pressure is released slowly as rapid release may cause damage to the "O" ring and release of high temperature liquids to the atmosphere.

In those tests pressurized by gas, the main valves to the gas supply are opened with the gas drain valve shut in (not shown). This valve is slowly opened to purge lines. When the lines were purged the drain valve was closed and the pressure adjusted to just below operating pressure (1000 psi). The valve was on the mineral oil side with the exception of the drain remained open for the pressure gates to read correctly. Pressure increases as the cell is heated so it was monitored closely until final test temperature was reached.

In each case, test temperature was set on the temperature controller (Watlow Model 942). Heating rate to test temperature was set at a minimum of 20 minutes. Each test was held at this temperature for the desired time. At the end of the test period, the temperature controller was turned off and the test cell was cooled to 140° F. using a water jacket. When temperature reached 140° F. pressure was bled from cell 10 slowly. Using the drain valve on the oil side or the drain valve on the gas side, as appropriate.

Next the teflon cell 12 was removed from the hastelloy cell 10 and the used acid discarded. The coupon was washed with soap and water, then rinsed with acetone, oven dried and cooled in a desiccator. The coupon was weighed and all surfaces were examined under a microscope, noting any changes and pitting on all surfaces.

Performance Criteria

Weight loss—The weight loss criteria for jointed tubulars such as J-55 and L-80 is less than 0.05 pounds per square foot of metal surface area. The criterion for coiled tubing is less than 0.02 pounds per square foot. These criteria are generally accepted by industry.

The corrosion rate reported for each test in Table 6 was determined by multiplying net weight by a conversion factor (to convert from grams per inch$^2$ to pounds per foot2).

Pitting—To be acceptable surface changes should be minimal with pitting nonexistent to only a very slight number of very small and very shallow pits.

As may be seen from the data of Table 6, antimony ions advantageously reduced the amount of copper plating present. In addition, the measured corrosion rate for test solutions 2 and 3 was very low. In this regard, acceptable corrosion weight loss for G-55 material is considered to be 0.05 lb/ft . No meaningful corrosion rate could be determined for Test 1 due to the copper coating, but the presence of copper is undesirable, due to galvanic corrosion concerns.

TABLE 6

Effect of Antimony Products on Copper Deposition in 7.5% HCl

| Test | HCl % | Nowferr$_3$ L/m3 | CuSO$_4$ Kg/m3 | AAC Kg/m3 | PYA L/m3 | Visual Rate Lb/ft2 | Visual Observations |
|---|---|---|---|---|---|---|---|
| 1 | 7.5 | 20 | 0.8 | | | | Heavy Copper Coating |
| 2 | 7.5 | 20 | 0.8 | 1 | | 0.003 | No Copper coating |
| 3 | 7.5 | 20 | 0.8 | | 5 | 0.005 | No Copper coating |

While the invention may be adaptable to various modifications and alternative forms, specific embodiments have been shown by way of example and described herein.

However, it should be understood that the invention is not intended to be limited to the particular forms While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

What is claimed is:

1. A method of treating a well, comprising introducing a well treatment fluid into said well, said well treatment fluid comprising:
   treatment acid;
   at least one of phosphinic acid, salt of phosphinic acid, or a mixture thereof,
   source of antimony ions; and
   source of copper ions;
   wherein said antimony ions and said copper ions are present in said well treatment fluid in amounts effective to co-catalyze reduction of ferric iron to ferrous iron.

2. The method of claim 1, wherein presence of said antimony and copper ions in said well treatment fluid reduce or substantially prevent formation of iron precipitation products during said well treatment.

3. The method of claim 1, wherein presence of said antimony ions in said well treatment fluid reduces or substantially prevents plating of copper on wellbore tubulars during said well treatment.

4. The method of claim 1, wherein said source of antimony ions is at least one of antimony acetate, antimony trichloride, antimony potassium tartrate, potassium pyroantimonate, antimony pentachloride, or a mixture thereof.

5. The method of claim 1, wherein said source of antimony ions is at least one of antimony acetate, antimony trichloride, potassium pyroantimonate, or a mixture thereof.

6. The method of claim 1, wherein said source of antimony ions is potassium pyroantimonate.

7. The method of claim 4, where said source of copper ions is at least one of cupric sulfate, cupric chloride, cuprous chloride, or a mixture thereof.

8. The method of claim 1, wherein said well treatment fluid further comprises a source of iodide ions, and wherein said iodide ions are present in said well treatment fluid in an amount effective to co-catalyze reduction of ferric iron to ferrous iron.

9. The method of claim 8, wherein presence of said antimony, copper and iodide ions in said well treatment fluid reduce or substantially prevent formation of iron precipitation products during said well treatment.

10. The method of claim 7, wherein said well treatment fluid further comprises a source of iodide ions; wherein said iodide ions are present in said well treatment fluid in an amount effective to co-catalyze reduction of ferric iron to ferrous iron; and wherein said source of iodide ions comprises potassium iodide.

11. The method of claim 1, wherein said treatment acid comprises at least one of hydrochloric acid, hydrofluoric acid, acetic acid, formic acid, sulfamic acid, phosphoric acid, or a mixture thereof.

12. A method of treating a well with a well treatment fluid, comprising:
   combining to form a well treatment fluid:
      treatment acid,
      at least one of phosphinic acid, a salt of phosphinic acid, or a mixture thereof,
      source of trivalent or pentavalent antimony ions,
      source of cuprous or cupric ions; and
      introducing said well treatment fluid into said well;
   wherein said antimony ions and said copper ions are present in said well treatment fluid in amounts effective to co-catalyze reduction of ferric iron to ferrous iron; and
      wherein said well penetrates a subterranean formation and oil is present within at least one of said well or said subterranean formation; wherein said phosphinic acid, salt of phosphinic acid, or mixture thereof is soluble in said acid used for treating said formation and does not form a precipitate during said well treatment; and wherein said source of trivalent or pentavalent antimony ions and said source of cuprous or cupric ions are in a form soluble in said treatment acid and are combined with said treatment acid as salts which do not form a sludge or precipitate with said oil in said subterranean formation.

13. The method of claim 13, wherein said source of trivalent antimony ions comprises antimony acetate, antimony trichloride, antimony potassium tartrate, or a mixture thereof; and wherein said source of pentavalent antimony ions comprises potassium pyroantimonate, antimony pentachloride, or a mixture thereof.

14. The method of claim 13, wherein said source of cupric ions comprises cupric sulfate or cupric chloride; and wherein said source of cuprous ions comprises cuprous chloride.

15. The method of claim 12, wherein said source of antimony ions comprises antimony acetate, antimony trichloride, potassium pyroantimonate, or a mixture thereof; and wherein said source of copper ions comprises cupric sulfate.

16. The method of claim 13, wherein said trivalent or pentavalent antimony ions are present in said well treatment fluid in an amount of from about 0.5% to about 40% by weight of the total weight of phosphinic acid and phosphinic acid equivalent of any phosphinic acid salt present; and wherein said phosphinic acid, phosphinic acid equivalent of any phosphinic acid salt present, or mixture thereof is present in said well treatment fluid in an amount of from about 2 to about 100 Kg per cubic meter of said well treatment fluid.

17. The method of claim 13, wherein said trivalent or pentavalent antimony ions is present in said well treatment fluid in an amount of from about 0.5% to about 20% by weight of the total weight of phosphinic acid and phosphinic acid equivalent of any phosphinic acid salt present; and wherein said phosphinic acid, phosphinic acid equivalent of any phosphinic acid salt present, or mixture thereof is present in said well treatment fluid in an amount of from about 2 to about 50 Kg per cubic meter of said well treatment fluid.

18. The method of claim 12, wherein said trivalent or pentavalent antimony ions are present in said well treatment fluid in an amount of from about 0.5% to about 40% by weight of the total weight of phosphinic acid and phosphinic acid equivalent of any phosphinic acid salt present; wherein said phosphinic acid, phosphinic acid equivalent of any phosphinic acid salt present, or mixture thereof is present in said well treatment fluid in an amount of from about 2 to about 100 Kg per cubic meter of said well treatment fluid; and wherein said cuprous or cupric ions are present in said well treatment fluid in an amount of from about 0.5% to about 40% by weight of the total weight of phosphinic acid and phosphinic acid equivalent of any phosphinic acid salt present.

19. The method of claim 12 wherein said combining further comprises combining a source of iodide ions to result in iodide ions present in said well treatment fluid in an amount effective to co-catalyze reduction of ferric iron to ferrous iron; and wherein said source of iodide ions is in a form soluble in said treatment acid.

20. The method of claim 18, wherein said combining further comprises combining a source of iodide ions to result in iodide ions present in said well treatment fluid in an amount effective to co-catalyze reduction of ferric iron to ferrous iron; wherein said source of iodide ions is in a form soluble in said treatment acid; and wherein said iodide ions are present in said well treatment fluid in an amount of from about 0.5% to about 40% by weight of the total weight of phosphinic acid and phosphinic acid equivalent of any phosphinic acid salt present.

21. The method of claim 14, wherein said combining further comprises combining a source of iodide ions to result in iodide ions present in said well treatment fluid in an amount effective to co-catalyze reduction of ferric iron to ferrous iron; wherein said source of iodide ions is in a form soluble in said treatment acid; and wherein said source of iodide ions comprises potassium iodide.

22. The method of claim wherein 13, said treatment acid is at least one of 1–34% hydrochloric acid, hydrofluoric acid, acetic acid, formic, sulfamic acid, phosphoric acid, or a mixture thereof.

23. A method of treating a well with a well treatment fluid, comprising
    combining to form a well treatment fluid:
        treatment acid comprising at least one of 1–34% hydrochloric acid, hydrofluoric acid, acetic acid, formic acid, sulfamic acid, phosphoric acid, or a mixture thereof;
        from about 2 Kg to about 100 Kg per cubic meter of well treatment fluid of at least one of phosphinic acid, a salt of phosphinic acid, or a mixture thereof that is soluble in said acid and which does not form a precipitate during said treating of said well;
        from about 0.5% to about 40% by weight of the total weight of phosphinic acid and phosphinic acid equivalent of any phosphinic acid salt present, of a source of antimony ions that is at least one of antimony acetate, antimony trichloride, antimony pentachloride, potassium pyroantimonate, potassium antimony tartrate, or a mixture thereof;
        from about 0.5% to about 40% by weight of the total weight of phosphinic acid and phosphinic acid equivalent of any phosphinic acid salt present, of a source of copper ions that is at least one of $CuSO_4$, $CuCl_2$, CuCl, or a mixture thereof; and
    introducing said well treatment fluid into said well.

24. The method of claim 23, wherein said combining further comprises combining a source of iodide ions to result in iodide ions present in said well treatment fluid in an amount effective to co-catalyze reduction of ferric iron to ferrous iron; and wherein said source of iodide ions is in a form soluble in said treatment acid; and wherein said iodide ions are present in said well treatment fluid in an amount of from about 0.5% to about 40% by weight of the total weight of phosphinic acid and phosphinic acid equivalent of any phosphinic acid salt present.

25. The method of claim 24, wherein said well penetrates a subterranean formation; wherein oil is present within at least one of said well or said subterranean formation; and wherein said source of iodide ions is in a form that is soluble in said treatment acid and that does not form a sludge or precipitate with said oil.

26. The method of claim 24, wherein said source of iodide ion is potassium iodide.

27. The method of claim wherein 23, said source of antimony ions is antimony acetate, potassium pyroantimonate, or a mixture thereof; and wherein said source of copper ions is $CuSO_4$.

28. The method of claim 23, wherein said source of antimony ions is antimony acetate, potassium pyroantimonate, or a mixture thereof; wherein said source of copper ions is $CuSO_4$; and wherein said source of iodide ions is potassium iodide.

* * * * *